United States Patent
Kang

(10) Patent No.: US 10,514,269 B2
(45) Date of Patent: Dec. 24, 2019

(54) AUTOMATED DRIVING DEVICE AND ASSISTING DEVICE FOR VEHICLE

(71) Applicant: DENSO International America, Inc., Southfield, MI (US)

(72) Inventor: Te-Ping Kang, Ann Arbor, MI (US)

(73) Assignee: DENSO International America, Inc., Southfield, MI (US)

(*) Notice: Subject to any disclaimer, the term of this patent is extended or adjusted under 35 U.S.C. 154(b) by 127 days.

(21) Appl. No.: 15/691,804

(22) Filed: Aug. 31, 2017

(65) Prior Publication Data

US 2019/0063942 A1 Feb. 28, 2019

(51) Int. Cl.
| | |
|---|---|
| G01C 21/36 | (2006.01) |
| G02B 27/01 | (2006.01) |
| G05D 1/00 | (2006.01) |
| G05D 1/02 | (2006.01) |
| G06K 9/00 | (2006.01) |

(52) U.S. Cl.
CPC ....... G01C 21/365 (2013.01); G01C 21/3655 (2013.01); G05D 1/0088 (2013.01); G05D 1/0223 (2013.01); G06K 9/00798 (2013.01); *G01S 2013/9321* (2013.01); *G02B 27/01* (2013.01); *G02B 2027/014* (2013.01); *G05D 2201/0213* (2013.01)

(58) Field of Classification Search
CPC .. G01C 21/365; G01C 21/3655; G02D 27/01; G05D 1/0088; G05D 1/0223; G06K 9/00798

USPC .......................................................... 701/25
See application file for complete search history.

(56) References Cited

U.S. PATENT DOCUMENTS

| | | | | |
|---|---|---|---|---|
| 2009/0319148 | A1* | 12/2009 | Kubo | B60T 7/22 701/96 |
| 2011/0066312 | A1* | 3/2011 | Sung | G05D 1/0223 701/25 |
| 2014/0253722 | A1* | 9/2014 | Smyth | G01P 3/38 348/135 |
| 2016/0195407 | A1* | 7/2016 | Sasaki | G01C 21/3697 701/36 |
| 2016/0347328 | A1* | 12/2016 | Takehara | B60W 50/10 |
| 2018/0074497 | A1* | 3/2018 | Tsuji | G06K 9/00288 |
| 2018/0284767 | A1* | 10/2018 | Minegishi | B60W 40/08 |
| 2019/0064829 | A1* | 2/2019 | Ozawa | B62D 15/0265 |

* cited by examiner

*Primary Examiner* — Yazan A Soofi

(57) ABSTRACT

An automated driving unit implements an automated driving of a vehicle by implementing a present operation and a subsequent operation in order. The subsequent operation is an operation to be implemented subsequently to the present operation during the automated driving. A determining unit determines the subsequent operation of the vehicle. An imaging unit creates an image relevant to the subsequent operation according to information on the subsequent operation. A display unit indicates the image relevant to the subsequent operation while the automated driving unit implements the present operation.

12 Claims, 18 Drawing Sheets

BEFORE SEGMENT 1
CONST SP

110

VEHICLE

310

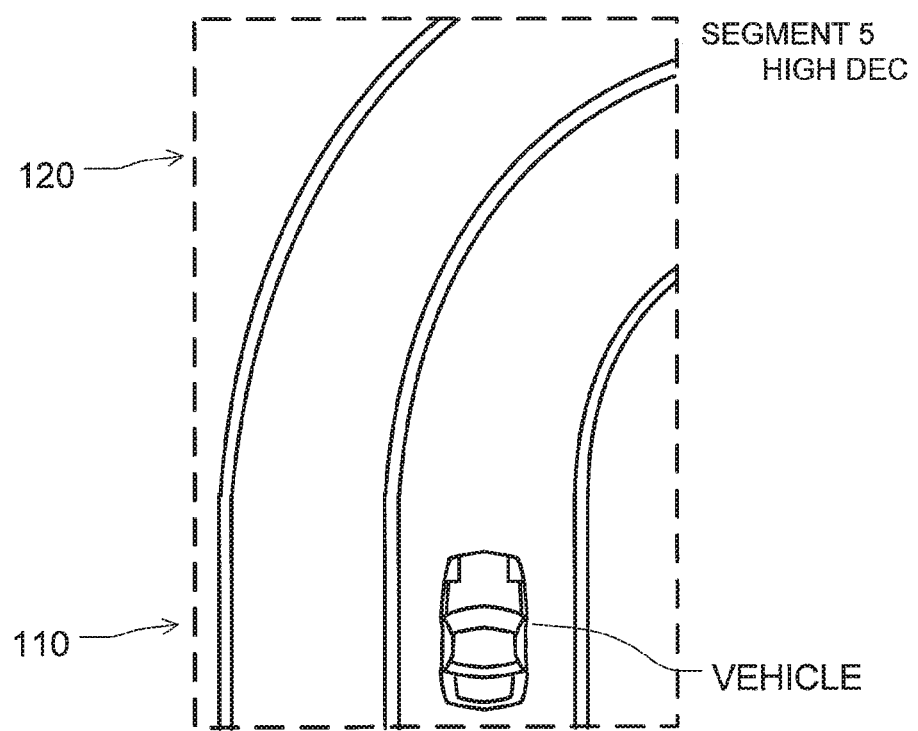
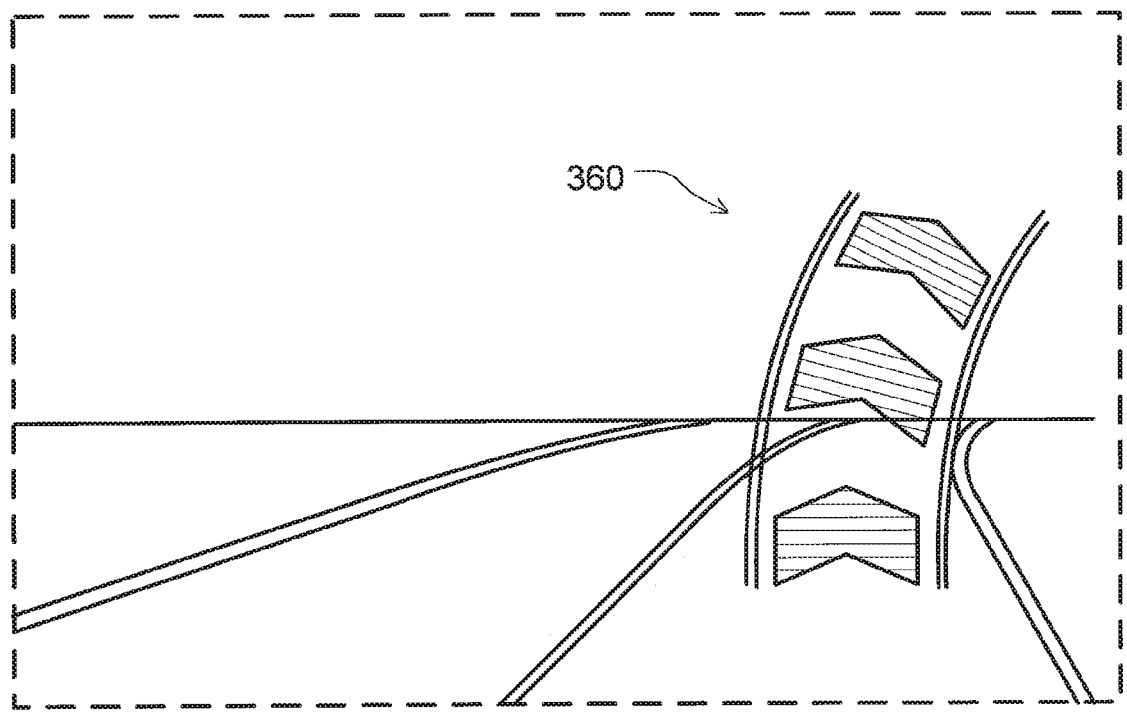

OTHER VEHICLE

SUBJECT VEHICLE

IMAGE

OTHER VEHICLE

AUTOMATED DRIVING DEVICE AND ASSISTING DEVICE FOR VEHICLE

TECHNICAL FIELD

The present disclosure relates to an automated driving device and an assisting device for a vehicle.

BACKGROUND

In recent years, automated driving devices have been developed.

SUMMARY

According to an aspect of the preset disclosure, an automated driving device is configured to indicate an image relevant to an operation of a vehicle.

BRIEF DESCRIPTION OF THE DRAWINGS

The above and other objects, features and advantages of the present invention will become more apparent from the following detailed description made with reference to the accompanying drawings. In the drawings:

FIGS. 4A to 9A are top views showing the vehicle travelling on segments 1 to 6, respectively, and FIGS. 4B to 9B are views showing the segments 1 to 6 and corresponding images, respectively, projected on the windshield;

DETAILED DESCRIPTION

An automated driving device, such as an adaptive cruise control system (driving assistant system) and a full automation system, would be effective for an occupant to reduce burden of driving.

An automated driving device implements automated driving to automatically operate the vehicle by automatically accelerating and decelerating the vehicle and by steering rightward and leftward. During the automated driving, an occupant of the vehicle would feel uncomfortable due to uncertainty of when the vehicle accelerates or decelerates and/or when the vehicle moves rightward and leftward.

One aspect of the disclosure is to determine series of operations of the vehicle to be implemented in order during the automated driving. Each of the series of operations includes, for example, acceleration, deceleration, and/or rightward and leftward movement. While the automated driving device implements a first one of the series of operations, the automated driving device indicates an image related to a second one of the series of operations, which is to be implemented subsequent to the first one during the automated driving. In other words, while the automated driving device implements the present operation, the automated driving device indicates the image related to a subsequent operation, which is to be implemented subsequent to the present operation. In this way, the automated driving is configured to notify an occupant of the subsequent operation in advance.

In the present disclosure, an automated driving may incorporate a low level driver assistance such as an adaptive cruise control to a middle or high level driver assistance such as a partial automation, a conditional automation, a high automation, and full automation.

First Embodiment

As follows, the first embodiment will be described with reference to drawings.

[Outline]

Figure 1:
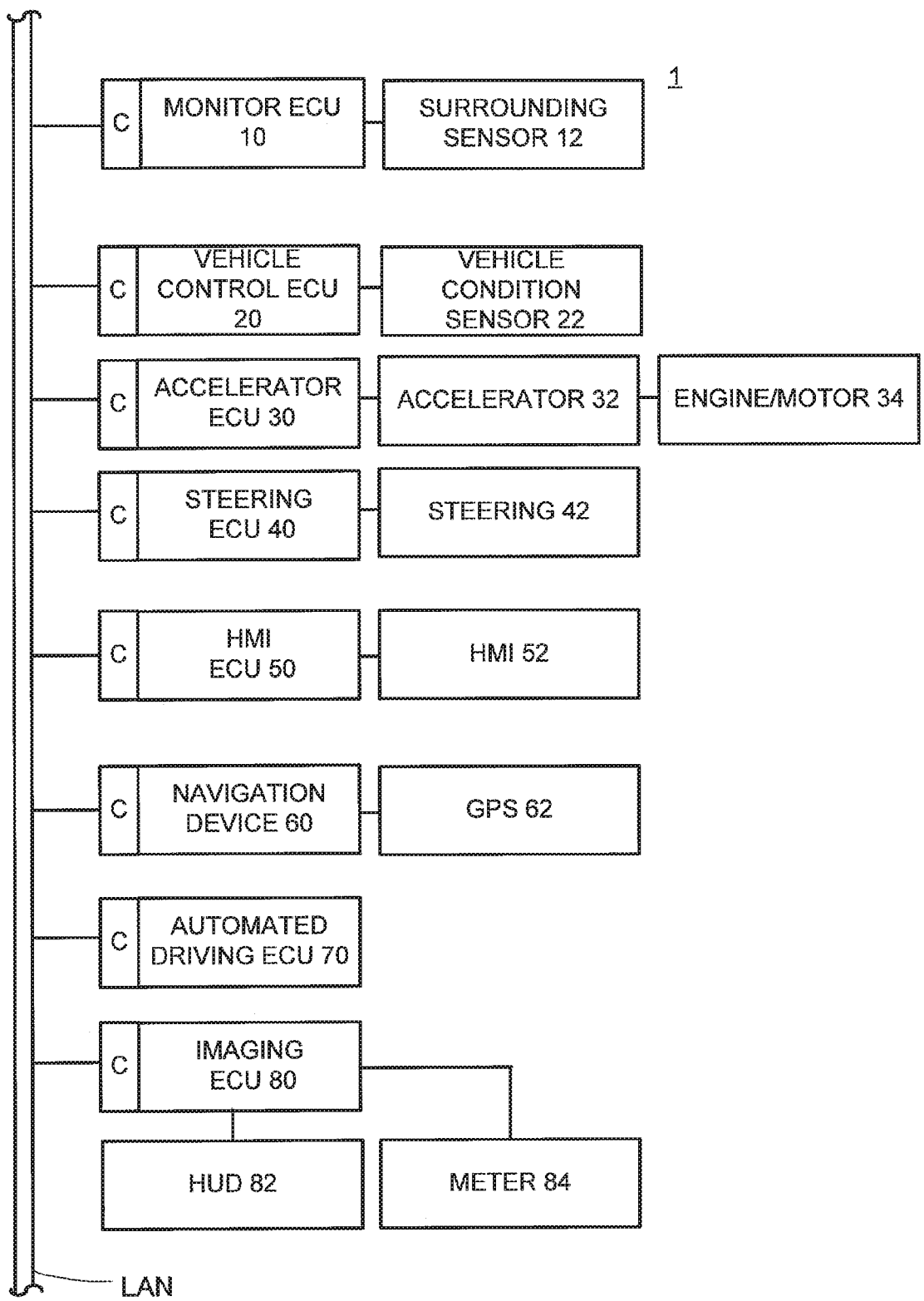
FIG. 1 is a diagram showing a configuration of an automated driving device for a vehicle.

FIG. 1 is a diagram showing a schematic configuration of an automated driving device 1 equipped to a vehicle. The automated driving device 1 includes a monitor ECU 10, a vehicle control ECU 20, a steering ECU 30, an accelerator ECU 30, a human machine interface (HMI) ECU 50, a navigation device 60, an automated driving ECU 70, and an imaging ECU 80. Those ECUs are communicated with each other via a vehicular LAN. Each of the ECUs has a communication unit C via which the ECU is communicated with other ECUs via the LAN by exchanging information in compliance with a protocol and is enabled to exchange information with other ECUs. Each ECU is mainly configured with a microcomputer including a CPU, a memory device such as a ROM, a RAM, and an EEPROM. The ECU further includes a bus for connecting those components and an I/O device for communicating with an external device.

[Monitor ECU]

The monitor ECU 10 is configured to retrieve surrounding information of the vehicle and to process the information. The monitor ECU 10 is connected with a surrounding sensor group 12. The surrounding sensor group 12 includes a radar device and a camera equipped to the vehicle and configured to detect a surrounding object present in surroundings of the vehicle.

The radar device is configured to emit exploration waves and to receive reflected waves to enable detection of a distance from a surrounding object according to a time difference between the waves. The camera device is a stereo camera device including a pair of camera modules to detect a position and a distance of a surrounding object in captured images according to a parallax quantity between the images. The surrounding sensor group 12 sends detection signals to the monitor ECU 10.

The monitor ECU 10 processes the signals from the surrounding sensor group 12 to acquire the dimension and the relative position of the surrounding object. The surrounding object includes a lane boundary of a lane of a road. The monitor ECU 10 successively sends the processed information to other ECUs via the LAN.

[Vehicle Control ECU]

The vehicle control ECU 20 is configured to detect a vehicle condition and to manipulate operation devices such as an accelerator device 32 and a steering device 42 of the vehicle. The vehicle control ECU 20 is connected with a vehicle condition sensor group 22. The vehicle condition sensor group 22 includes various sensors such as a vehicle speed sensor, an acceleration sensor, a yaw rate sensor, a steering angle sensor, and an accelerator sensor for detecting the condition of the vehicle. The vehicle speed sensor detects a vehicle speed. The acceleration sensor detects an acceleration that acts on the vehicle. The yaw rate sensor detects an angular speed (yaw rate) of the vehicle. The steering angle sensor detects a steering angle of the steering device 42 of the vehicle. The accelerator sensor detects a manipulation of the accelerator device 32 of the vehicle.

The vehicle control ECU 20 manipulates an operation device such as the accelerator device 32 and the steering device 42 based on a manipulation quantity, which is sent as an instruction from the automated driving ECU 70 (described later). In the present example, the vehicle control ECU 20 sends instructions to the accelerator ECU 30 and the steering ECU 40 to automatically perform an acceleration and deceleration control on the accelerator device 32 and a steering control on the steering device 42.

[Accelerator ECU]

The accelerator ECU 30 is configured to control the accelerator device 32 of the vehicle in line with the instructions from the vehicle control ECU 20. The accelerator ECU 30 is connected with the accelerator device 32. The accelerator device 32 is further connected with a torque source 34 of the vehicle. The torque source 34 may be an internal combustion engine and/or an electric motor. The accelerator device 32 may be configured to manipulate a fuel injection quantity and an intake air quantity of the internal combustion engine to produce a desired torque required for acceleration and deceleration. The accelerator may be configured to manipulate a quantity of an electric power supplied to the motor to manipulate the motor to produce the desired torque. The accelerator ECU 30 may also function as a brake actuator to activate a brake device and/or function as a motor generator of the vehicle to control deceleration.

[Steering ECU]

The steering ECU 40 is configured to control the steering device 42 of the vehicle in line with the instructions from the vehicle control ECU 20. The steering ECU 40 is connected with the steering device 42 to activate an electronic steering actuator to control the steering angle of the steering device 42.

[HMI ECU]

Figure 16:
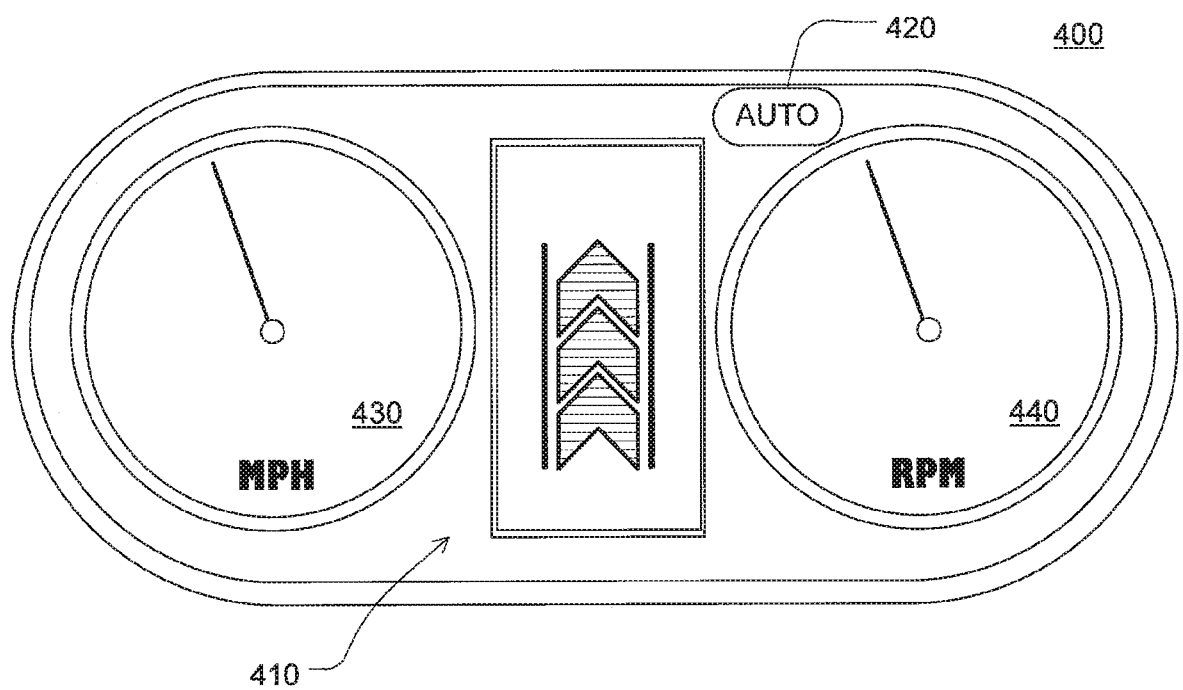
FIG. 16 is a view showing a meter cluster.

The HMI ECU 50 is connected with HMI devices 52 such as an operation switch group. The operation switch group is a mechanical switch and/or a touch screen provided around a steering wheel and/or a meter cluster 400 (FIG. 16). The operation switch group enables an occupant to provide instructions to various functional devices of the vehicle and to modify various configuration settings of the devices. The operation switch group includes an automated driving switch 420 (FIG. 16) for activating and deactivating the automated driving. The HMI ECU 50 receives signals from the operation switch group and executes various processing. The HMI ECU 50 sends the signals to other ECUs via the LAN.

[Navigation Device]

A navigation device 60 is connected with a GPS device 62 to retrieve the coordinates of the vehicle. The navigation device 60 may have a generally known configuration including a microcomputer, a storage device storing a map data and a program product, a display device indicating the position of the vehicle on a map and surrounding geography. The navigation device 60 enables an occupant to set a start point and an end point and calculation of multiple candidates of paths between the start point and the end point. The navigation device 60 enables the user to select one of the paths. The navigation device 60 sends various information such as the coordinates retrieved with the GPS device 62 and the map to other ECUs via the LAN.

[Automated Driving ECU]

The automated driving ECU 70 is configured to compute data required for the automated driving and to control the vehicle control ECU 20 during the automated driving.

In the following example, the automated driving ECU 70 retrieves the selected path between the start point and the end point in the map from the navigation device 60 via the LAN. The automated driving ECU 70 creates a planned locus and a planned speed in the entire selected path in consideration of various factors such as geometry, traffic regulations, expected traffic conditions, and the like. During the automated driving, the vehicle travels generally along the planned locus at the planned speed. The automated driving ECU 70 corrects the planned locus and the planned speed in real time in consideration of updated information during the automated driving.

When the automated driving ECU 70 creates the planned locus and the planned speed, the automated driving ECU 70 divides the entire selected path into a large number of segments. The automated driving ECU 70 computes the planned locus and the planned speed in each of the segments.

The automated driving ECU 70 starts automated driving in response to an instruction by an occupant such as activation of the automated driving switch 420 (FIG. 16). During the automated driving, the automated driving ECU 70 further computes a manipulation quantity of each of the accelerator device 32 and the steering device 42 to enable the vehicle to travel along the planned locus at the planned speed. The automated driving ECU 70 sends the computed manipulation quantity as an instruction to the vehicle control ECU 20. In response, the vehicle control ECU 20 instructs the accelerator ECU 30 and the steering ECU 40 to manipulate the accelerator device 32 and the steering device 42 in line with the instruction. In this way, the automated driving ECU 70 manipulates the vehicle control ECU 20 to operate the vehicle.

The automated driving ECU 70 receives the surrounding information from the monitor ECU 10 in real time during the automated driving. The automated driving ECU 70 modifies the planned locus and the planned speed timely according to the updated surrounding information to avoid surrounding object and to adapt to unexpected traffic conditions.

In addition to the above-described factors, when creating the planned locus and the planned speed in each of the segments, the automated driving ECU 70 further considers a relationship between adjacent segments.

Figure 2:
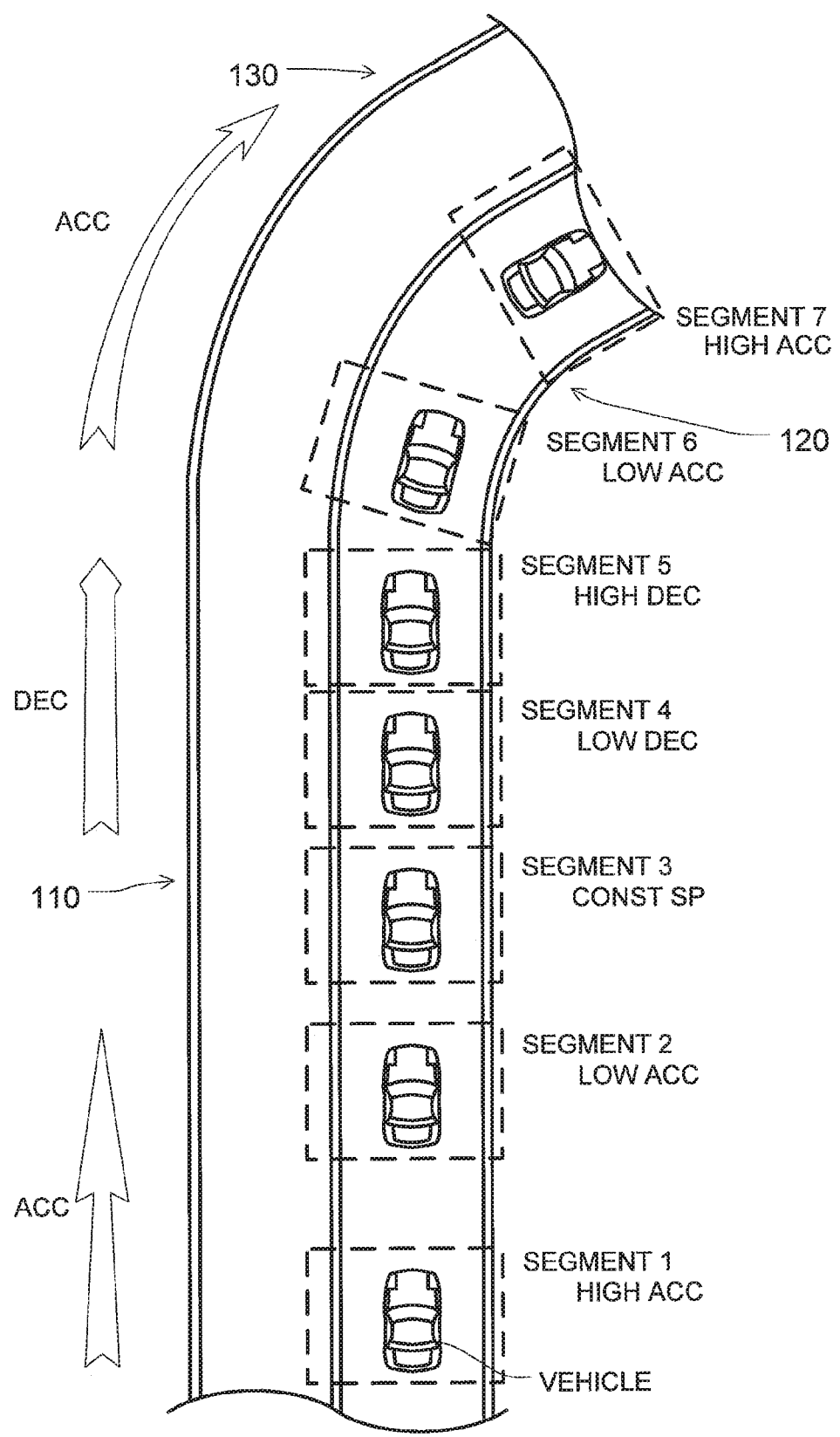
FIG. 2 is a diagram showing an example of a segmented road on which the vehicle travels.

As follows, an example will be described with reference to FIG. 2. In the example, a two-lane highway road includes a first straight road 110, a curved road 120, and a second straight road 130 in this order.

In this example, the automated driving ECU 70 first determines to increase the planned speed in the beginning of the first straight road 110. Subsequently, the automated driving ECU 70 determines to decrease the planned speed on the first straight road 110 in advance of the curved road 120 to enable the vehicle to safely enter the curved road 120. The automated driving ECU 70 determines to turn the vehicle in the curved road 120 while increasing the planned speed again. The automated driving ECU 70 determines to further increase the planned speed to cause the vehicle to enter the second straight road 130 at an accelerated speed.

In this example, the highway road is roughly divided into segments 1 to 7 as surrounded by the dotted lines in the drawing. The vehicle is supposed to travel through the segments 1 to 7 in this order. The planned locus and the planned speed are determined in each of the segments 1 to segment 7 to implement a lane-keep driving on the right lane in the highway road.

In the segments 1 to 5, the planned locus is determined to a straight path to cause the vehicle to go straight. In the segment 1, the planned speed is determined to increase quickly to accelerate at a high acceleration quantity. In the segment 2, the planned speed is determined to increase less quickly to accelerate at a low acceleration quantity to a predetermined speed. In the segment 3, the planned speed is determined to be constant at the predetermined speed.

In the segment 4, the planned speed is determined to decrease less quickly to decelerate at a low deceleration quantity. In the segment 5, the planned speed is determined to decrease more quickly to decelerate at a high deceleration quantity in advance of the curved road 120.

In the segment 6, the planned locus is determined to corner rightward along the curved road 120, and the planned speed is determined to increase again to accelerate again at the low acceleration quantity while cornering the curved road 120. In the segment 7, the planned locus is determined to a straight path again, and the planned speed is determined to increase again to accelerate at the high acceleration quantity.

The automated driving ECU 70 further computes a planned acceleration quantity and a planned steering quantity based on the planned locus and the planned speed in each segment. The automated driving ECU 70 sends the planned acceleration quantity and the planned steering quantity to the imaging ECU 80 via the LAN.

[Imaging ECU]

Referring back to FIG. 1, the imaging ECU 80 is configured to create an image representing a subsequent operation. The subsequent operation includes the planned acceleration quantity and the planned steering quantity, by which the vehicle is expected to be operated in a subsequent segment.

The imaging ECU 80 receives the planned acceleration quantity and the planned steering quantity from the automated driving ECU 70. The imaging ECU 80 creates an image representing the planned acceleration quantity and the planned steering quantity as the subsequent operation expected in the upcoming subsequent segment.

In the present disclosure, the creation of the image includes creation of both still image and animation of the image. The animation is, for example, scrolling of the image.

The imaging ECU 80 is connected with a head-up display (HUD) 82 for projecting the image from the inside of the vehicle onto a windshield of the vehicle to indicate a virtual image on the windshield. The HUD 82 projects the image (HUD image) to be superimposed on a front view seen from an occupant through the windshield. The HUD 82 is constructed of a microcomputer to process the created image into a bitmap image, a liquid crystal display (LCD) to indicate the bitmap image, a lighting device, and a combination of mirrors and lenses (not shown).

The imaging ECU 80 sends digital data of the created image of the subsequent segment to the microcomputer of the HUD 82. The microcomputer of the HUD 82 is configured to receive the digital data and cause the LCD to indicate the bitmap image. The lighting device illuminates the LCD to project the indicated bitmap image through the combination of mirrors and lens onto the windshield.

In the present configuration, the imaging ECU 80 and the HUD 82 enables projection of the created image of the upcoming subsequent segment thereby to pre-notify an occupant of the subsequent operation to be expected in the subsequent segment. The configuration may enable the occupant to be prepared for upcoming motion of the vehicle, such as acceleration, deceleration, and lateral movement, to be caused by the subsequent operation.

One example will be described with reference to FIGS. 3A to 9B.

0. Before High Acceleration

Figure 3A:
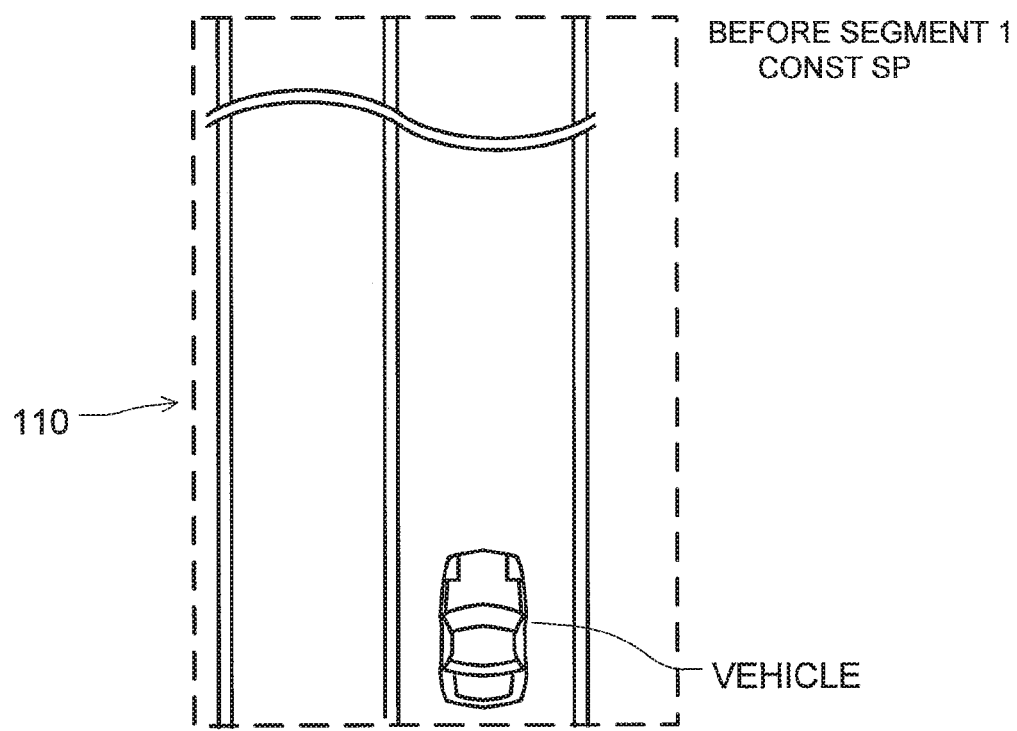
FIG. 3A is a top view showing the vehicle travelling on a part of the road in advance of a segment 1.
Figure 3B:
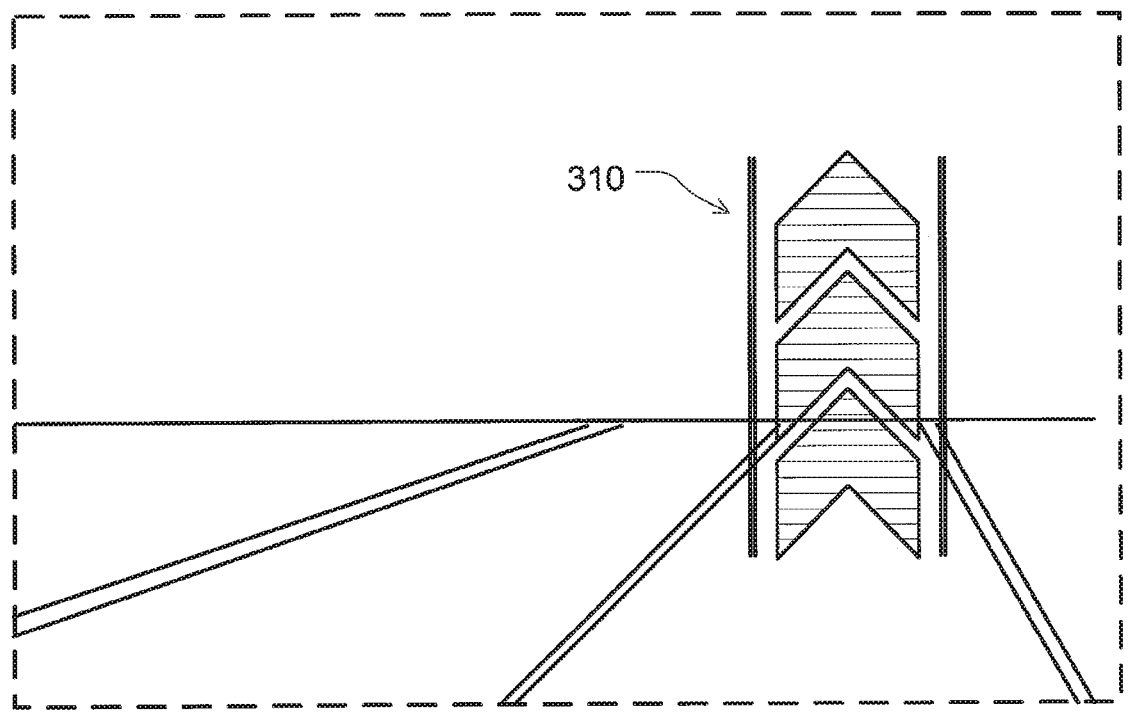
FIG. 3B is a view showing the part of the road and an image projected on a windshield of the vehicle.

FIG. 3A is a top view showing a part of the first straight road 110 immediately before the segment 1. FIG. 3B is a view showing the part of the first straight road 110 seen from the position of an occupant through the windshield. In FIG. 3B, the image projected on the windshield is located at a position corresponding to a center of a lane on which the vehicle travels.

In the state of FIGS. 3A and 3B, the vehicle is immediately before the segment 1, and the vehicle is travelling at a constant speed. The vehicle is expected to accelerate at a high acceleration quantity in the subsequent segment 1. In this condition, the imaging ECU 80 creates an image 310 of the subsequent segment 1 and causes the HUD 82 to project the image 310. The image 310 represents the high acceleration quantity. That is, even though the vehicle is presently travelling at a constant speed, the image 310 representing the high acceleration quantity is projected. In this way, an occupant is pre-notified of the upcoming subsequent operation of the vehicle to accelerate at the high acceleration quantity in the subsequent segment 1. In the present processing, the imaging ECU 80 creates the image 310 as arrows (image elements) each being in a sharpened shape. The arrows are large and close to each other. The arrows are in a noticeable color such as navy blue. The imaging ECU 80 creates the image 310 to be scrolled most quickly.

1. Before Low Acceleration

Figure 4A:
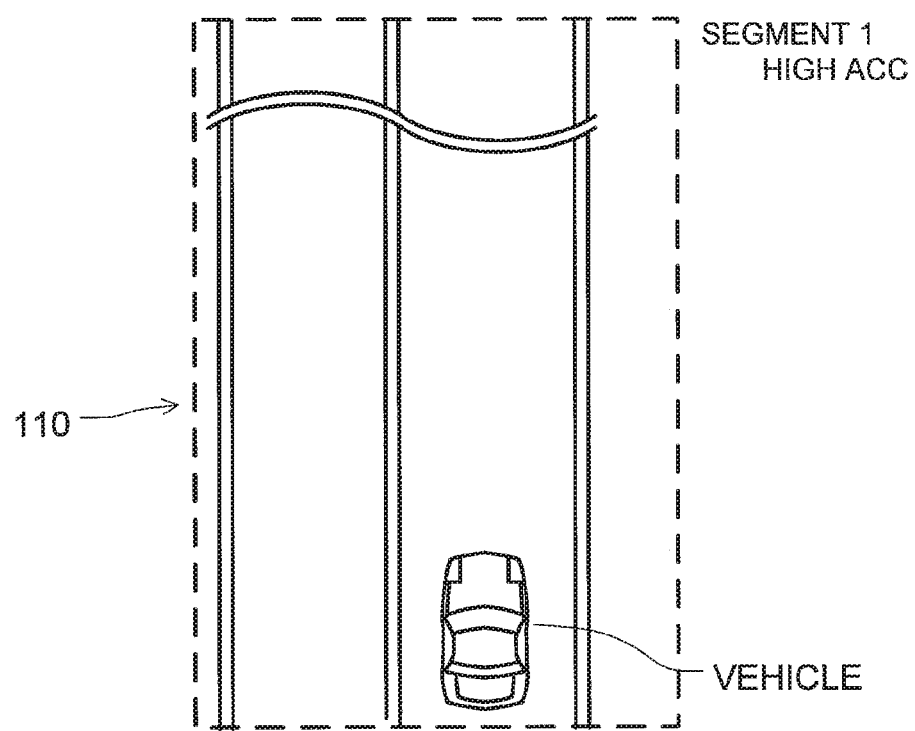
Figure 4B:
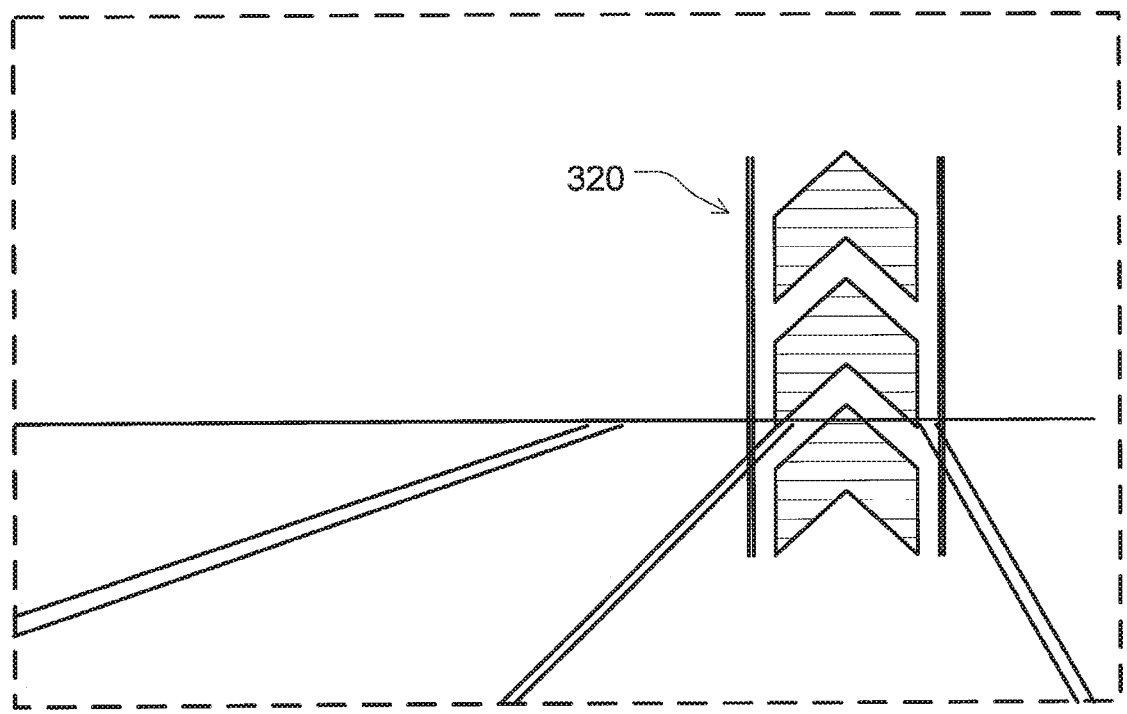

As shown in FIGS. 4A and 4B, when the vehicle is in the segment 1, the vehicle is presently accelerating at the high acceleration quantity, and the vehicle is going to reduce present acceleration to the subsequent segment 2. Subsequently, the vehicle is going to accelerate at a low acceleration quantity in the subsequent segment 2. In this segment 1, the imaging ECU 80 creates an image 320 of the upcoming segment 2 and causes the HUD 82 to project the image 320. The image 320 represents the low acceleration quantity. In this way, the occupant is pre-notified of the upcoming subsequent operation of the vehicle to accelerate at the low acceleration quantity in the subsequent segment 2. In the present processing, the imaging ECU 80 creates the image 320 as arrows each being in a less sharpened shape compared with the image 310 representing the high acceleration quantity. The arrows are less bigger and less closer compared with the image 310. The arrows are in a second most noticeable color such as fainter blue. The imaging ECU 80 creates the image 320 to be scrolled second most quickly.

2. Before Constant Speed

Figure 5A:
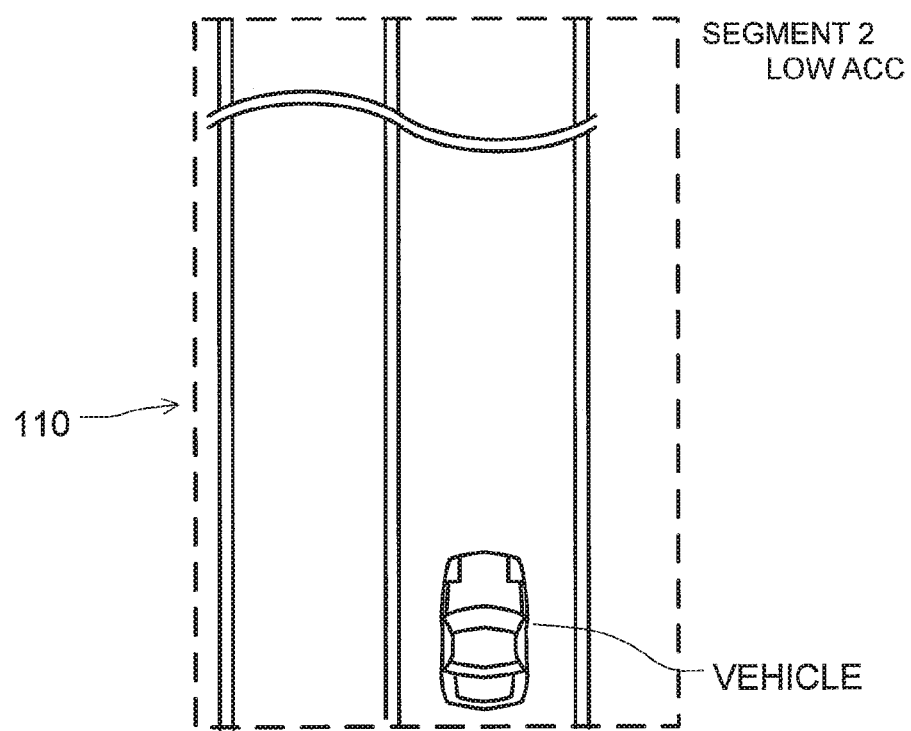
Figure 5B:
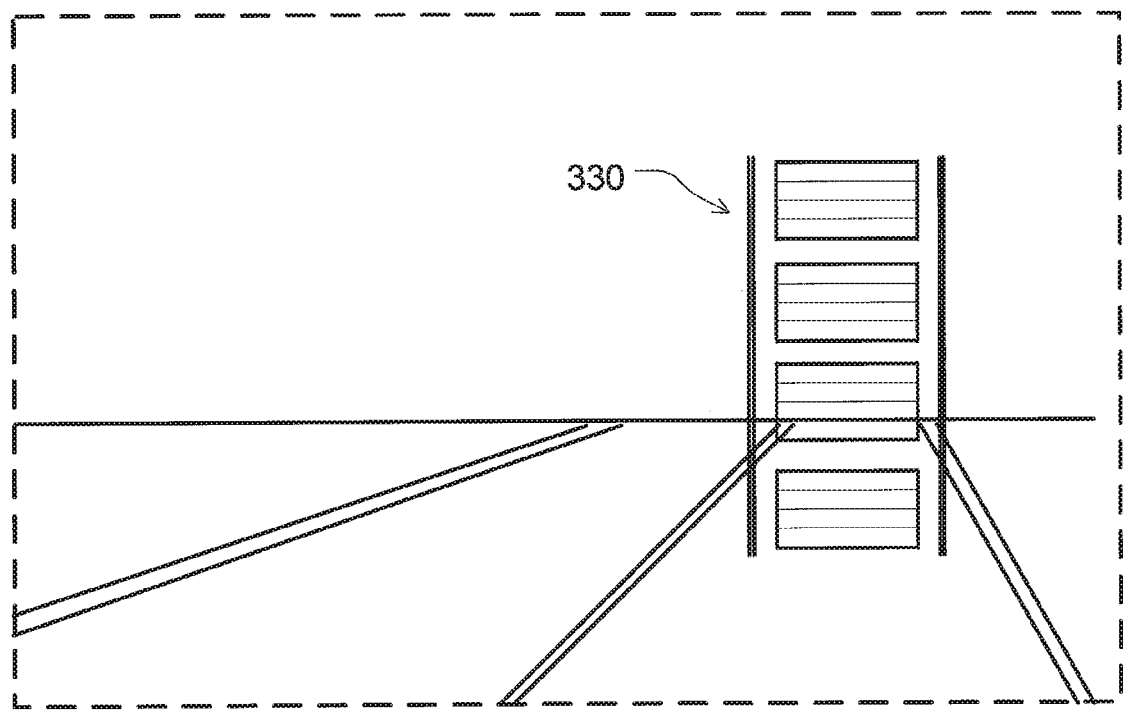

As shown in FIGS. 5A and 5B, when the vehicle is in the segment 2, the vehicle decelerates at the low-acceleration quantity, and the vehicle is going to further reduce the present acceleration to the subsequent segment 3. Subsequently, the vehicle is going to travel at a constant speed in the subsequent segment 3. In this segment 2, the imaging ECU 80 creates the image 330 of the upcoming segment 3 and causes the HUD 82 to project the image 330. The image 330 represents the constant speed. In this way, the occupant is pre-notified of the upcoming subsequent operation of the vehicle to travel at the constant speed in the subsequent segment 3. In the present processing, the imaging ECU 80 creates the image 330 as rectangles (image elements). The rectangles are less bigger and less closer compared with the image 320 representing the low acceleration quantity. The rectangles are in a third most noticeable color such as very light blue. The imaging ECU 80 creates the image 330 to be scrolled third most quickly.

3. Before Low Deceleration

Figure 6A:
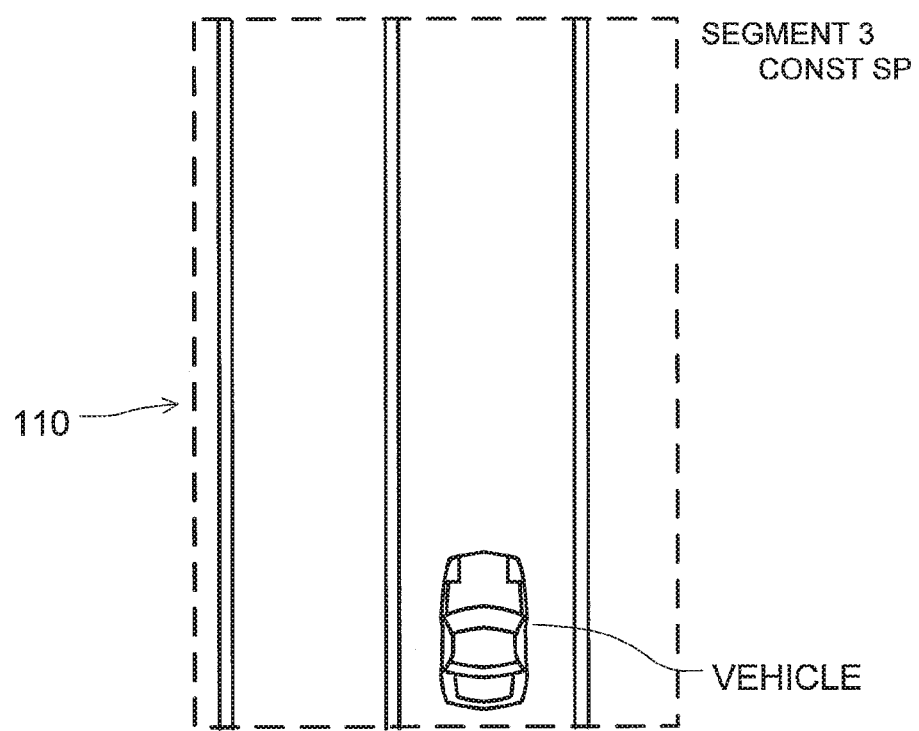
Figure 6B:
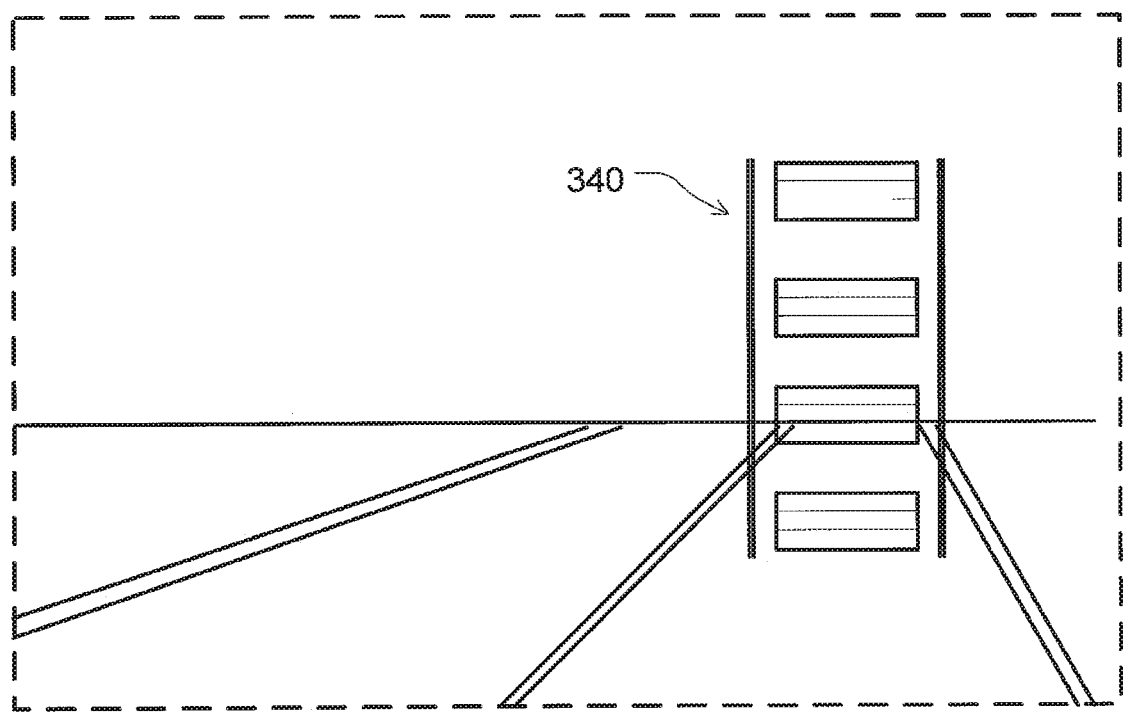

As shown in FIGS. 6A and 6B, when the vehicle is in the segment 3, the vehicle travels at the constant speed, and the vehicle is going to decelerate at the low deceleration quantity in the subsequent segment 4. In this segment 3, the imaging ECU 80 creates the image 340 of the upcoming segment 4 and causes the HUD 82 to project the image 340. The image 340 represents the low deceleration quantity. In this way, the occupant is pre-notified of the upcoming subsequent operation of the vehicle to decelerate at the low deceleration quantity in the subsequent segment 4. In the present processing, the imaging ECU 80 creates rectangles. The rectangles are less bigger and less closer compared with the image 330 at the constant speed. The rectangles are in a relatively noticeable color such as fainted red. The imaging ECU 80 creates the image 340 to be scrolled fourth most quickly.

4. Before High Deceleration

Figure 7A:
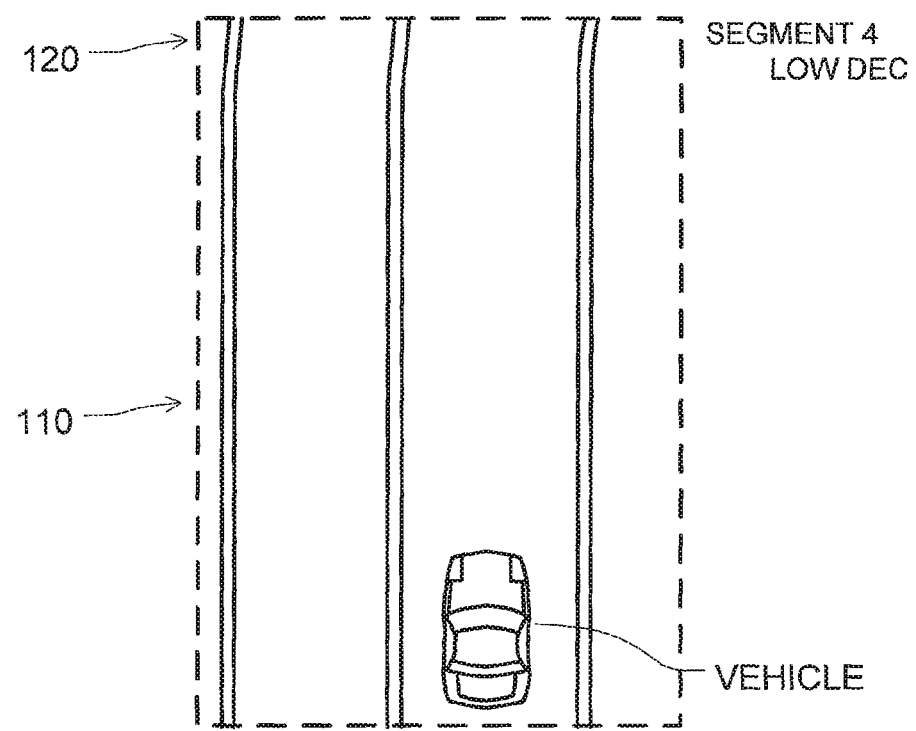
Figure 7B:
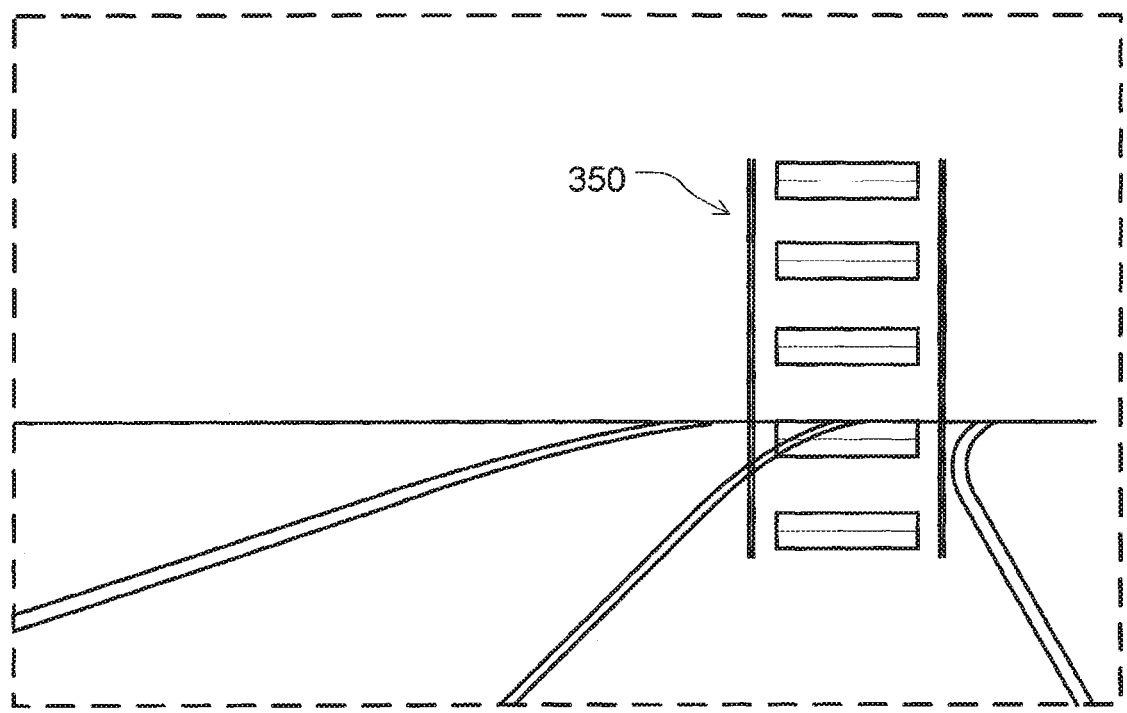

As shown in FIGS. 7A and 7B, when the vehicle is in the segment 4, the vehicle decelerates at the low deceleration quantity, and the vehicle is going to further decelerate at the high deceleration quantity in the subsequent segment 5. In this segment 4, the imaging ECU 80 creates the image 350 of the upcoming segment 5 and causes the HUD 82 to project the image 350. The image 350 represents the high deceleration quantity. In this way, the occupant is pre-notified of the upcoming subsequent operation of the vehicle to decelerate at the high deceleration quantity in the subsequent segment 5. In the present processing, the imaging ECU 80 creates rectangles. The rectangles are less bigger and less closer compared with the image 340 in the low deceleration. The rectangles are in a mostly noticeable color such as bright red. The imaging ECU 80 creates the image 350 to be scrolled fifth most quickly.

5. Before Curved Road

As shown in FIGS. 8A and 8B, when the vehicle is in the segment 5, the vehicle is still traveling on the straight road at the high deceleration quantity, and the vehicle is going to turn rightward and to accelerate at the low acceleration quantity in the subsequent segment 6. In this segment 5, the imaging ECU 80 creates the image 360 of the upcoming segment 6 and causes the HUD 82 to project the image 360. The image 360 represents the turning rightward and the low acceleration quantity. In this way, the occupant is pre-notified of the upcoming subsequent operation of the vehicle to corner the curved rode and to accelerate at the low acceleration quantity in the subsequent segment 6. In the present processing, the imaging ECU 80 creates arrows being in a curved shape. The arrows are same as the image 320 in the low acceleration in size, closeness, color, and scroll speed.

6. Before Over Curved Road

Figure 9A:
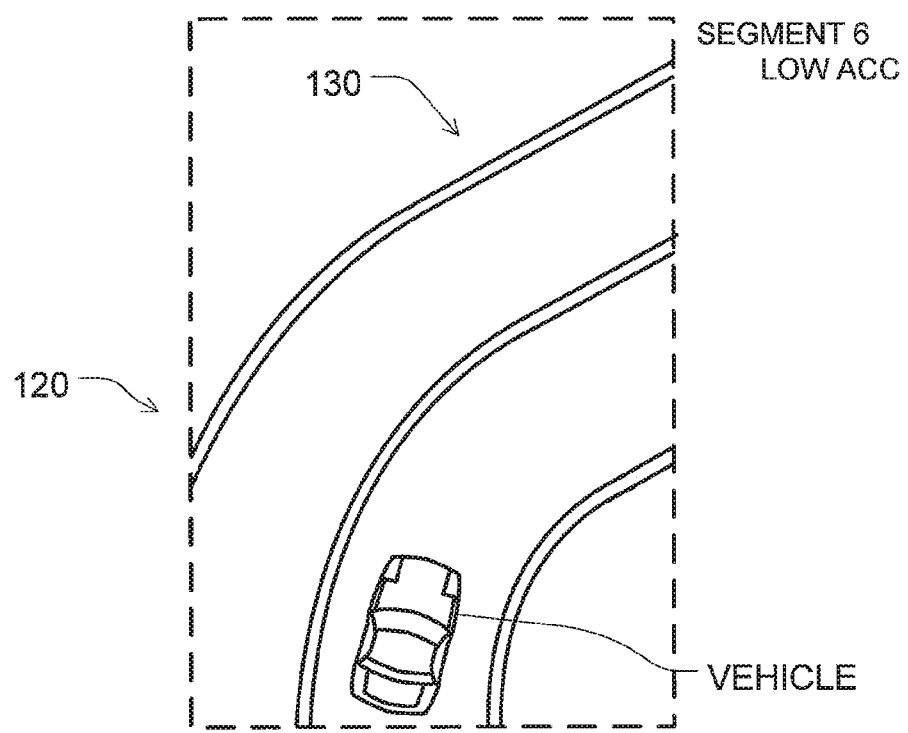
Figure 9B:
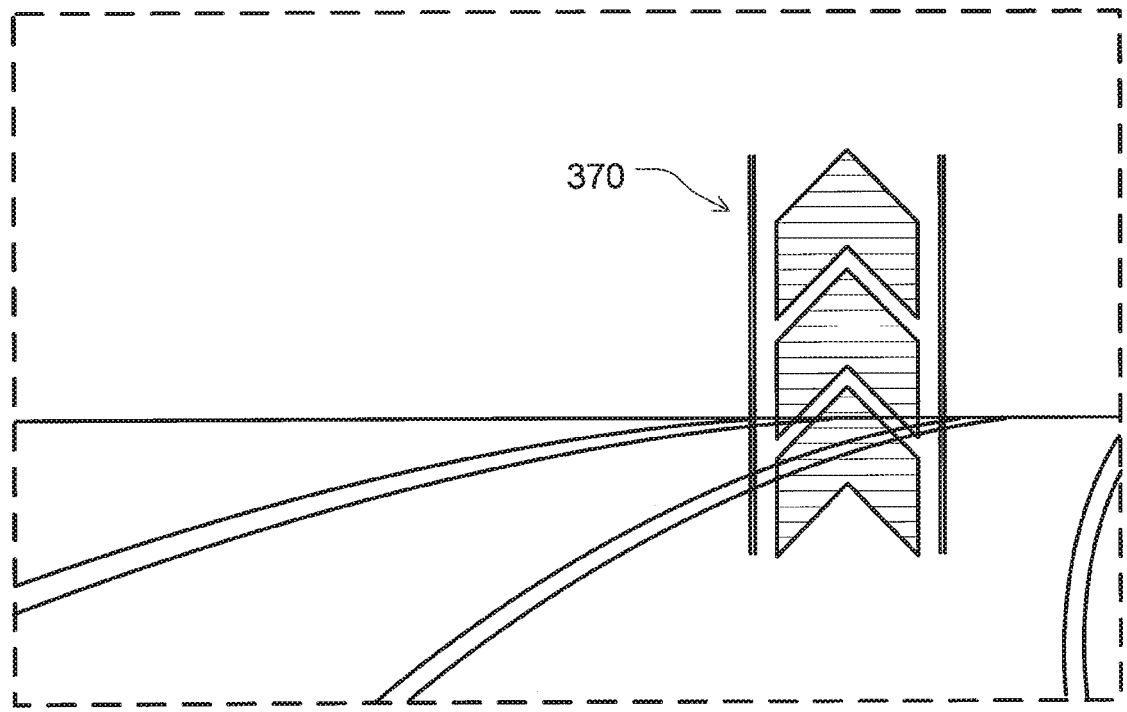

As shown in FIGS. 9A and 9B, when the vehicle is in the segment 6, the vehicle is cornering the curved road 120 and accelerating at the low acceleration quantity. Subsequently, the vehicle is going to return to go straight and to accelerate at the high deceleration quantity in the subsequent segment 7. In this segment 6, the imaging ECU 80 creates the image 370 of the upcoming segment 7 and causes the HUD 82 to project the image 370. The image 370 represents the travelling straight and the high deceleration quantity. In this way, the occupant is pre-notified of the upcoming subsequent operation of the vehicle to go straight again and to accelerate at the high acceleration quantity in the subsequent segment 7. In the present processing, the imaging ECU 80 creates arrows same as the image 310 in the high acceleration in size, closeness, color, and scroll speed.

[Dimension of Image]

Figure 10:
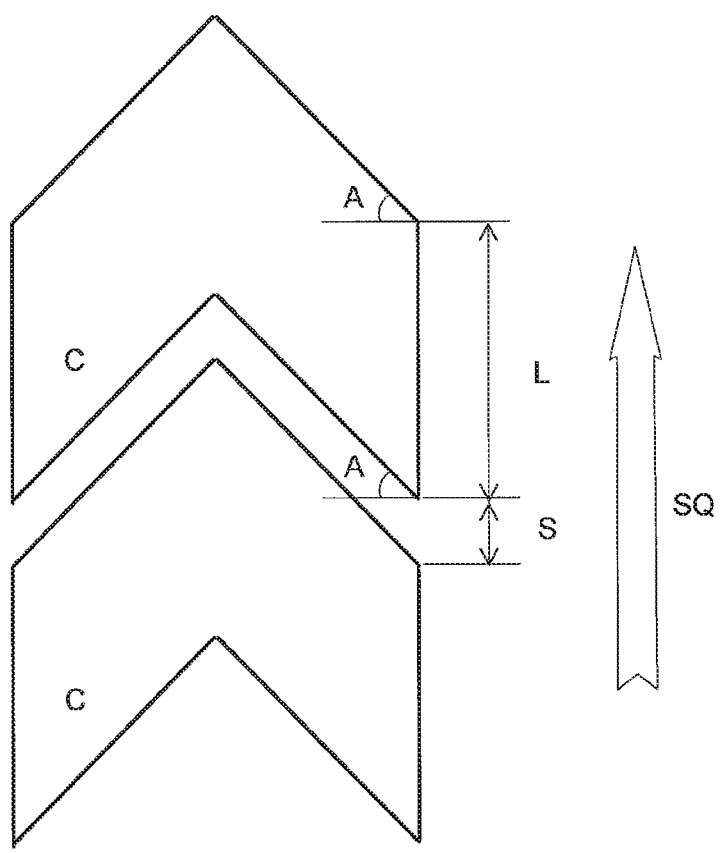
FIG. 10 is a view showing arrows as the image.

Definition of the dimension of the image will be described with reference to FIG. 10. The angle A relates to the sharpness of the image. The image becomes arrow by setting the angle A to be greater than 0. The arrow is sharpened by increasing the angle A. The image becomes the rectangle by setting the angle A at zero. The image is made bigger by increasing the length L and is made smaller by decreasing the length L. The image is made closer by decreasing the space S and is made sparser by increasing the space S. The color C is selected from the noticeable colors and the less noticeable colors as exemplified above. The image moves upward faster by increasing the scroll speed SQ.

[Effect]

As described above, the imaging ECU 80 causes the HUD 82 to project the image representing the subsequent operation which is to be implemented in the subsequent segment. In this way, the automated driving device 1 notifies an occupant of the subsequent operation in advance. The automated driving device 1 may enable the occupant to prepare for the subsequent operation such as acceleration, deceleration, and lateral movement and may enhance comfortability of an occupant.

[Before Automated Driving]

Figure 11:
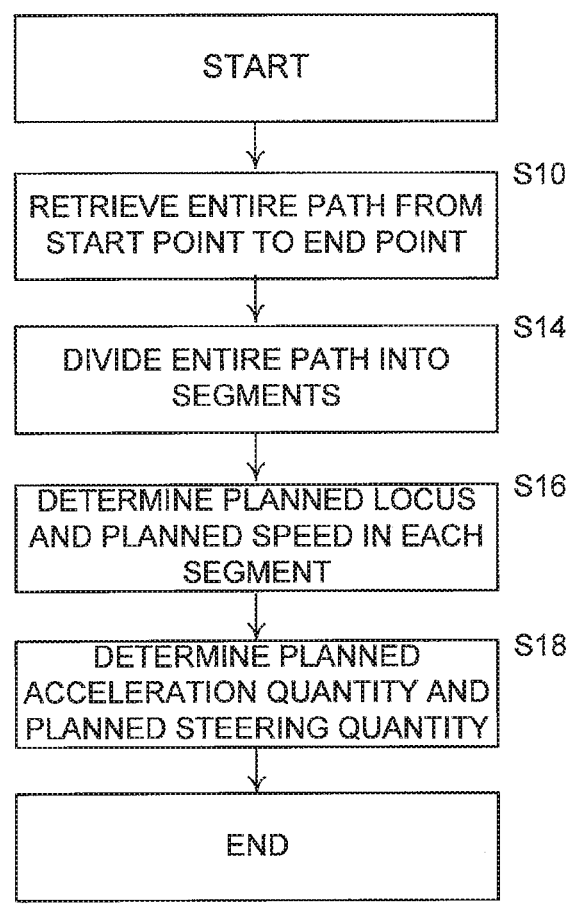
FIGS. 11 and 12 are flowcharts related to an automated driving.

As follows, an operation of the automated driving ECU 70, before the automated driving will be described with reference to FIG. 11. At step S10, the automated driving ECU 70 receives from the navigation device 60 the selected entire path from the start point to the end point. At step S14, the automated driving ECU 70 divides the entire selected path into multiple segments. At step S16, the automated driving ECU 70 computes and determines the planned locus and the planned speed in each of the segments. At step S18, the automated driving ECU 70 computes and determines the planned acceleration quantity and the planned steering quantity based on the planned locus and the planned speed.

[During Automated Driving]

Figure 12:
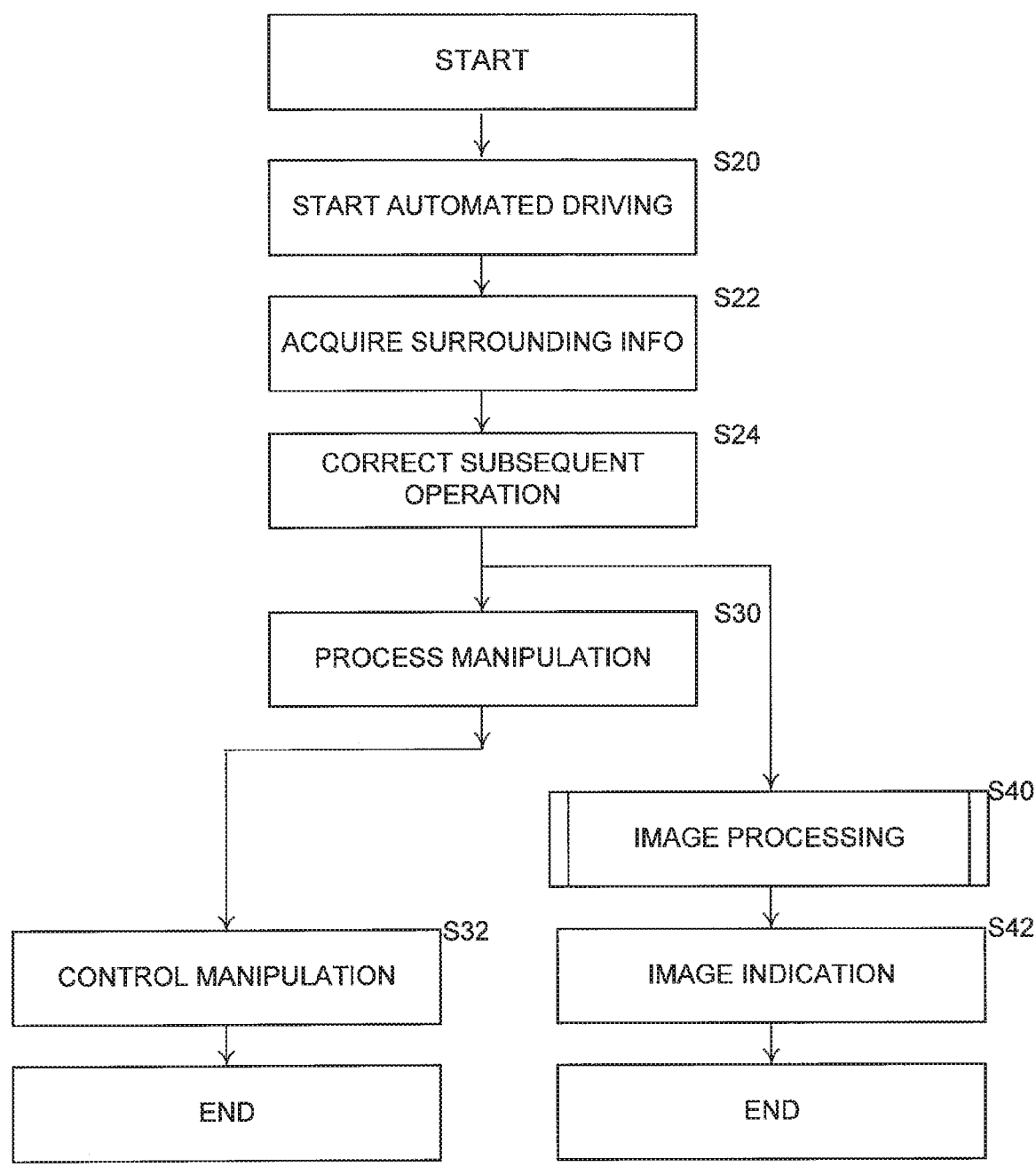

As follows, an operation of the automated driving ECU 70, the vehicle control ECU 20, and the imaging ECU 80 related to the automated driving will be described with reference to FIG. 12.

At step S20, the automated driving ECU 70 starts the automated driving on activation of the automated driving switch 420. At step S22, the automated driving ECU 70 acquires the surrounding information from the monitor ECU 10 in real time.

At step S24, the automated driving ECU 70 corrects the planned acceleration quantity and the planned steering quantity based on the surrounding information in real time. The automated driving ECU 70 sends the planned acceleration quantity and the planned steering quantity as corrected to the imaging ECU 80.

At step S30, automated driving ECU 70 further computes the manipulation quantity of each of the accelerator device 32 and the steering device 42 in real time based on the planned acceleration quantity and the planned steering quantity as corrected. The automated driving ECU 70 sends the manipulation quantity as an instruction to the vehicle control ECU 20.

At step S32, the vehicle control ECU 20 sends the manipulation quantity to each of the accelerator ECU 30 and the steering ECU 40. The accelerator ECU 30 and the steering ECU 40 manipulate the accelerator device 32 and the steering device 42, respectively, based on the manipulation quantity to operate the vehicle to travel.

At step S40, the imaging ECU 80 implements image processing to create the image representing the subsequent operation. At step S42, the imaging ECU 80 computes coordinates of the image, at which the HUD 82 projects the image on the windshield, such that the created image is to be projected on the lane where the vehicle travels. The imaging ECU 80 sends the created image as the digital data to the HUD 82 to cause the HUD 82 to project the image on the windshield at the computed coordinates.

[Selection of Processing]

As follows, the image processing will be descried with reference to the flowchart in FIG. 13. In the following processing, thresholds satisfy the following relationship: TH1>TH2>TH3>TH4. TH3 is set at 0. TH4 is set at a negative value.

At step S110, the imaging ECU 80 determines whether an acceleration quantity ACC of the subsequent operation is greater than or equal to a threshold TH1.

When step S110 makes positive determination (YES), at step S211, the imaging ECU 80 creates the high acceleration image 310. When step S110 makes negative determination (NO), at step S120, the imaging ECU 80 determines whether the acceleration quantity ACC of the subsequent operation is greater than or equal to a threshold TH2.

When step S120 makes positive determination (YES), at step S221, the imaging ECU 80 creates the low acceleration image 320. When step S120 makes negative determination (NO), at step S130, the imaging ECU 80 determines whether the acceleration quantity ACC of the subsequent operation is greater than or equal to a threshold TH3.

When step S130 makes positive determination (YES), at step S231, the imaging ECU 80 creates the constant speed image 330. When step S130 makes negative determination (NO), at step S140, the imaging ECU 80 determines whether the acceleration quantity ACC of the subsequent operation is greater than or equal to a threshold TH4.

When step S140 makes positive determination (YES), at step S241, the imaging ECU 80 creates the low deceleration image 340. When step S140 makes negative determination (NO), at step S251, the imaging ECU 80 creates the high deceleration image 350.

[Creation of Image]

As follows, the creation of each image will be descried with reference to the flowcharts in FIGS. 14A to 14E. In the following description, values satisfy the following relationships: A1>A2; L1>L2>L3>L4>L5; S1>S2>S3>S4>S5; and SQ1>SQ2>SQ3>SQ4>SQ5.

Figure 14A:
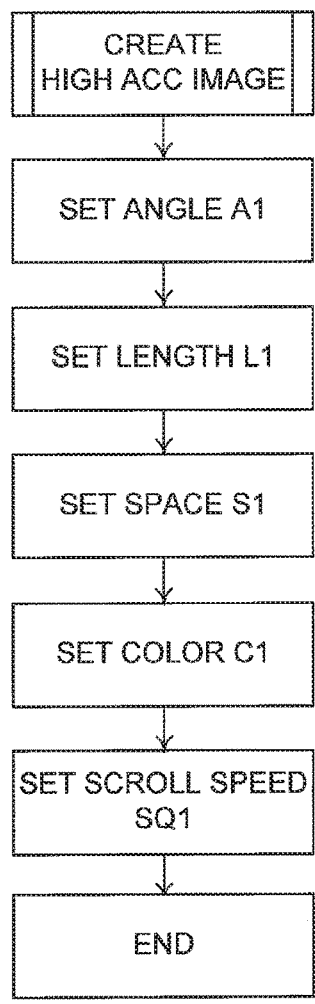

As shown in FIG. 14A, at step S211, the imaging ECU 80 creates the high acceleration image 310 as follows. At step S2112, the imaging ECU 80 sets the angle A at A1 to form the sharpened arrows. At step S2113, the imaging ECU 80 sets the length L of each of the arrows at L1. At step S2114, the imaging ECU 80 sets the space S between the arrows at S1. At step S2115, the imaging ECU 80 sets the color C of the arrows at C1. At step S2116, the imaging ECU 80 sets the scroll speed SQ at SQ1.

Figure 14B:
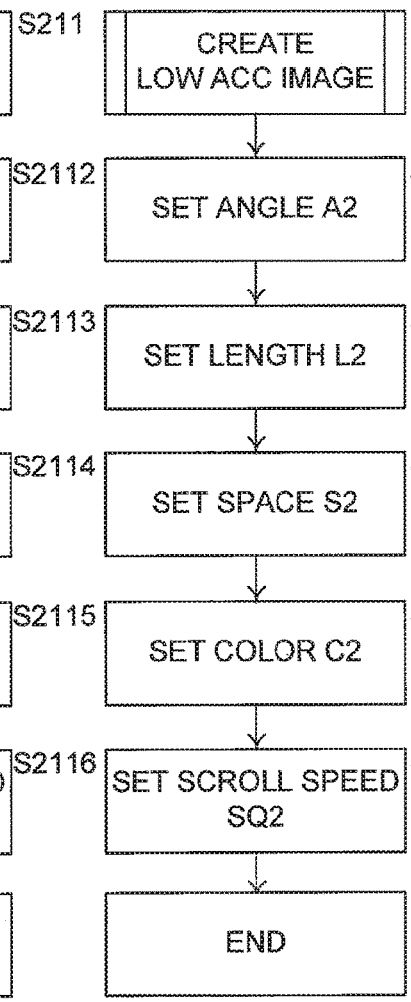

As shown in FIG. 14B, at step S221, the imaging ECU 80 creates the low acceleration image 320 as follows. At step S2212, the imaging ECU 80 sets the angle A at A2 to form the less sharpened arrows as the image. At step S2213, the imaging ECU 80 sets the length L of each of the arrows at L2. At step S2214, the imaging ECU 80 sets the space S between the arrows at S2. At step S2215, the imaging ECU 80 sets the color C of the arrows at C2. At step S2216, the imaging ECU 80 sets the scroll speed SQ at SQ2.

Figure 14C:
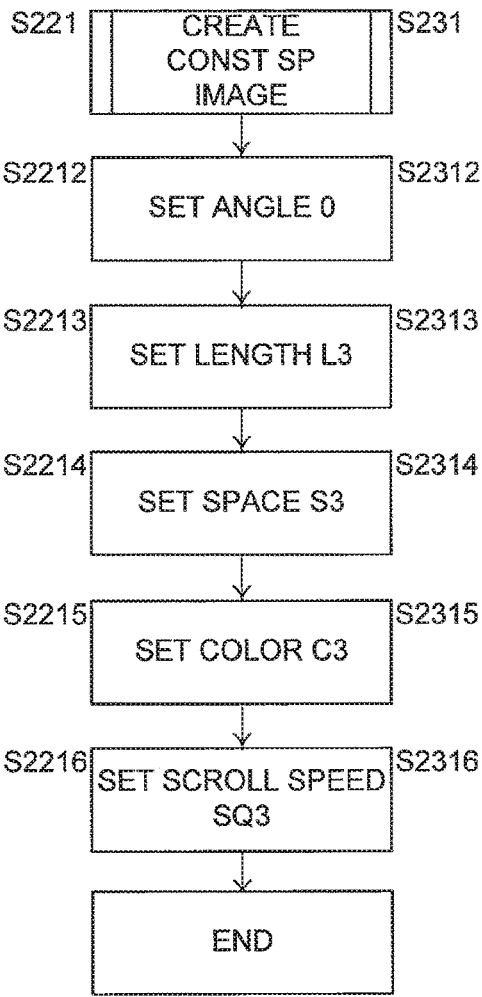

As shown in FIG. 14C, at step S231, the imaging ECU 80 creates the constant speed image 330 as follows. At step S2312, the imaging ECU 80 sets the angle A at 0 to form the rectangles. At step S2313, the imaging ECU 80 sets the length L of each of the rectangles at L3. At step S2314, the imaging ECU 80 sets the space S between the rectangles at S3. At step S2315, the imaging ECU 80 sets the color C of the rectangles at C3. At step S2316, the imaging ECU 80 sets the scroll speed SQ at SQ3.

Figure 14D:
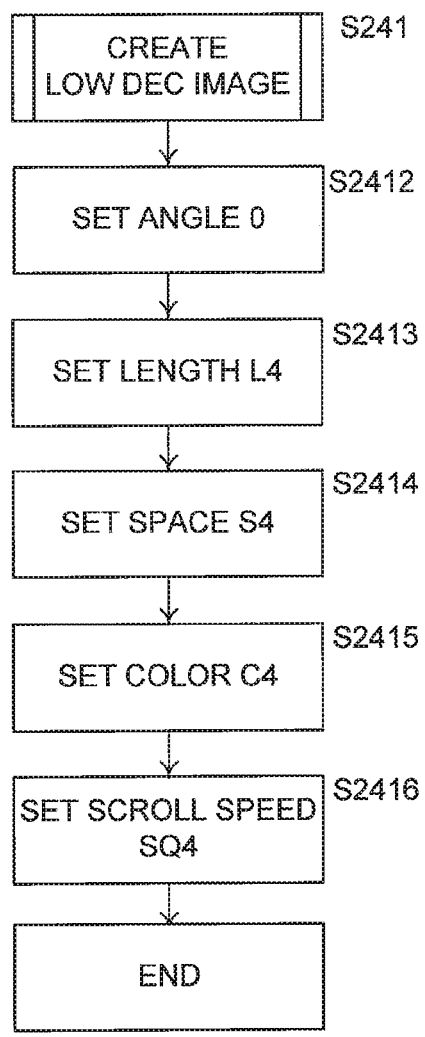

As shown in FIG. 14D, at step S241, the imaging ECU 80 creates the low deceleration image 340 as follows. At step S2412, the imaging ECU 80 sets the angle A at 0 to form the rectangles. At step S2413, the imaging ECU 80 sets the length L of each of the rectangles at L4. At step S2414, the imaging ECU 80 sets the space S between the rectangles at S4. At step S2415, the imaging ECU 80 sets the color C of the rectangles at C4. At step S2416, the imaging ECU 80 sets the scroll speed SQ at SQ4.

Figure 14E:
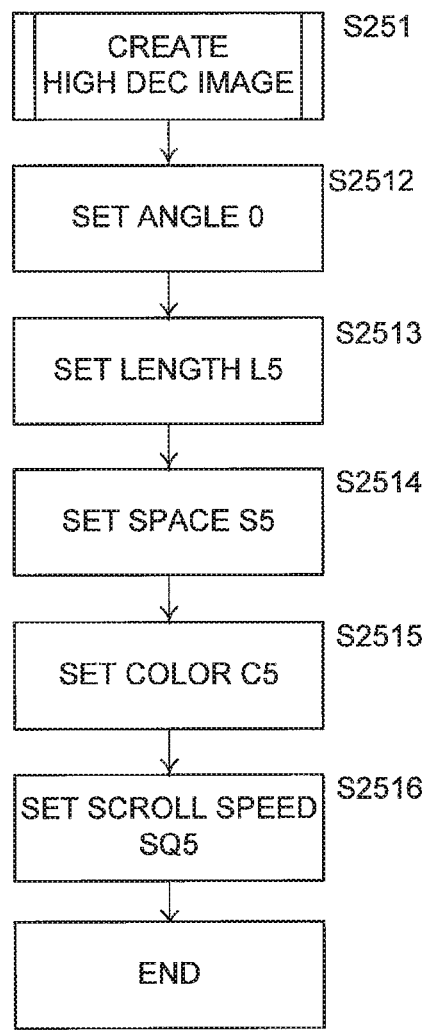

As shown in FIG. 14E, at step S251, the imaging ECU 80 creates the high deceleration image 340 as follows. At step S2512, the imaging ECU 80 sets the angle A at 0 to form the rectangles. At step S2510, the imaging ECU 80 selects rectangles. At step S2513, the imaging ECU 80 sets the length L of each of the rectangles at L5. At step S2514, the imaging ECU 80 sets the space S between the rectangles at S5. At step S2515, the imaging ECU 80 sets the color C of the rectangles at C5. At step S2516, the imaging ECU 80 sets the scroll speed SQ at SQ5.

Figure 13:
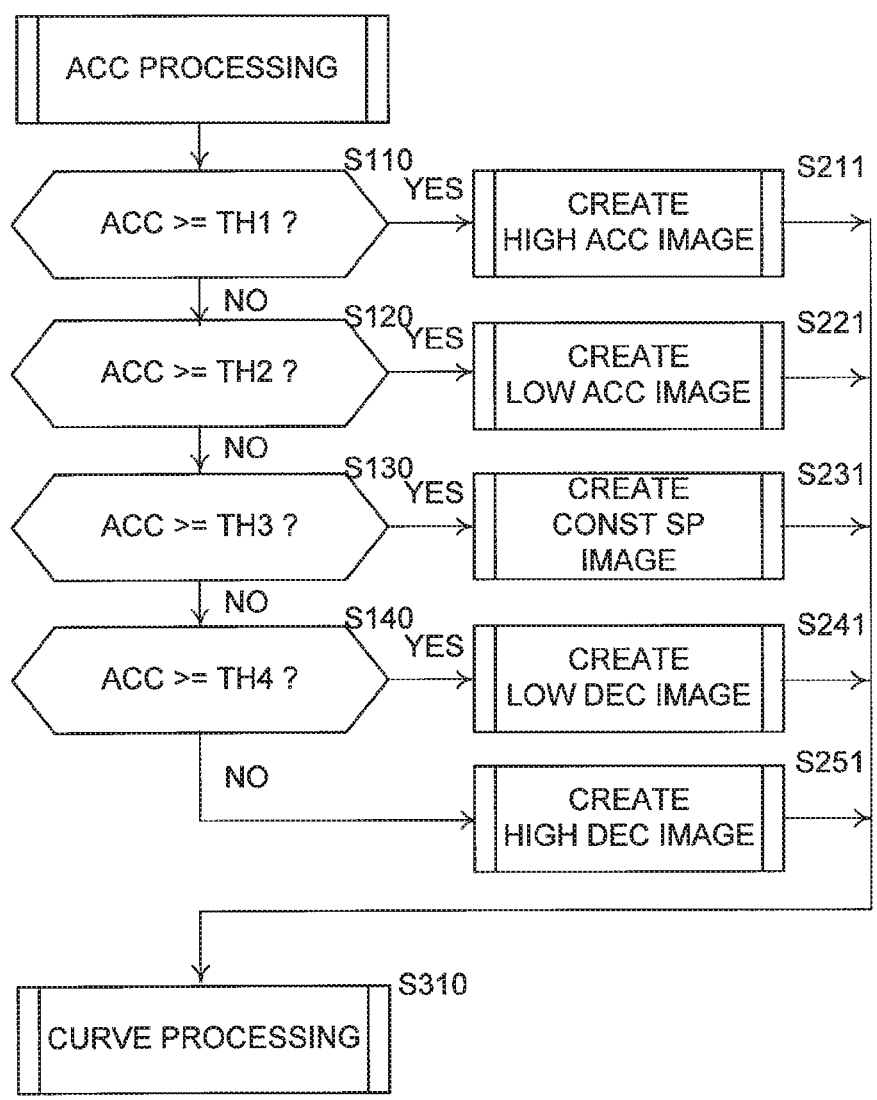
FIGS. 13 to 15 are flowcharts related to creation and indication of the image related to the automated driving.
Figure 15:
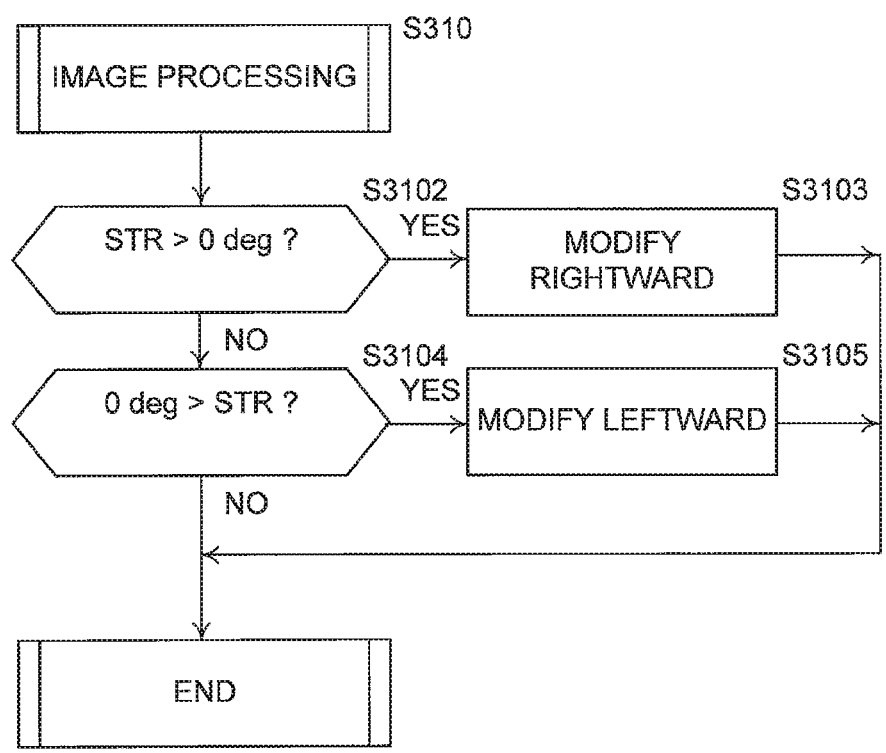

Subsequent to either S211, S221, S231, S241, or S251 in FIG. 13, the processing proceeds to S310 in FIG. 15. In FIG. 15, at step S310, the imaging ECU 80 modifies the created image as follows.

At step S3102, the imaging ECU 80 determines whether the steering quantity STR is greater than 0 degree. When step S3102 makes positive determination (YES), at step S3103, the imaging ECU 80 modifies the created image to be in a curved shape at a curvature directed rightward. The curvature may correspond to the steering quantity.

When step S3102 makes negative determination (NO), at step S3104, the imaging ECU 80 determines whether the steering quantity STR is less than 0 degree. When step S3104 makes positive determination (YES), at step S3105, the imaging ECU 80 modifies the created image to be in a curved shape at a curvature directed leftward. The curvature may correspond to the steering quantity.

Second Embodiment

As shown in FIG. 16, the meter cluster 400 includes a speed meter 430 and a tachometer 440. The meter cluster 400 further includes a display device 410 to indicate the image as described above. In the second embodiment, the HUD 82 may be omitted.

Third Embodiment

Figure 17A:
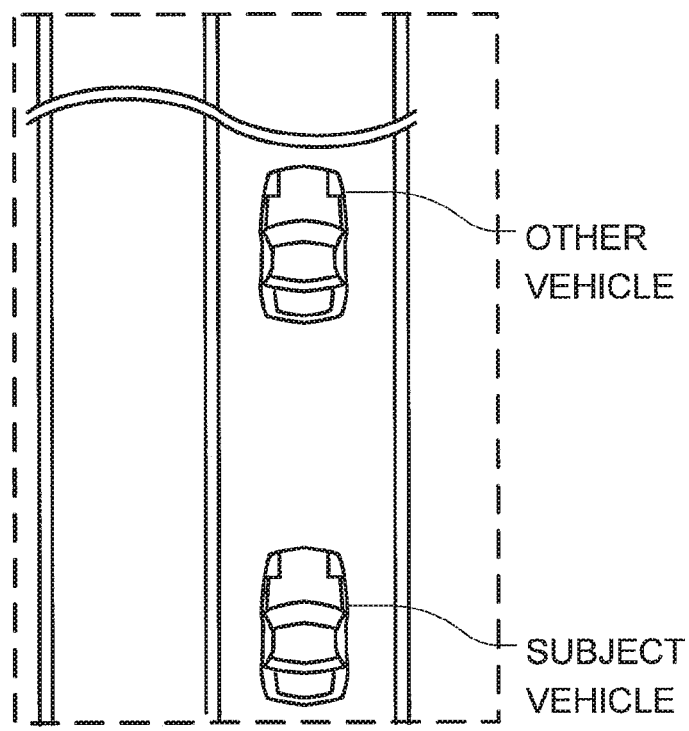
FIGS. 17A and 17B are views showing an example.
Figure 17B:
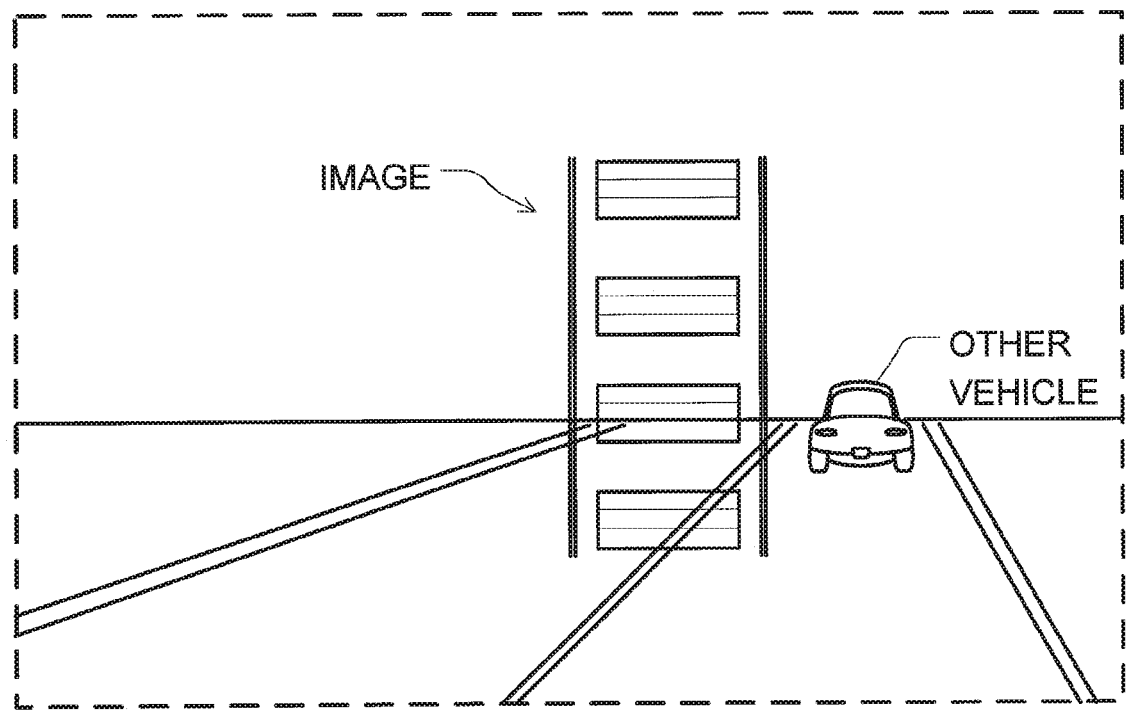

An automated driving device 1 according to the present third embodiment is further configured to determine whether the image is overlapped with another vehicle ahead of the vehicle (subject vehicle). Specifically, as shown in FIGS. 17A and 17B, the automated driving device 1 is configured, on determination that the image is overlapped with the other vehicle in the windshield, to move the image projected on the windshield to another position not to overlap with the other vehicle in the windshield.

More specifically, the automated driving ECU 70 detects whether the other vehicle travels ahead of the subject vehicle on the same lane according to the surrounding information sent from the monitor ECU 10.

On determination that the other vehicle travels ahead of the subject vehicle on the same lane, the imaging ECU 80 computes the coordinates of the image, at which the HUD 82 projects the image on the windshield, such that the image does not overlap with the other vehicle in the windshield. The imaging ECU 80 computes the coordinates of the image in consideration of the size of the image and the size of the other vehicle viewed in the windshield.

The imaging ECU 80 may compute a maximum size of the other vehicle, when the other vehicle approaches closest to the subject vehicle, and may approximate the other vehicle by a rectangle at the maximum size. In this case, the imaging ECU 80 computes the coordinates of the image such that the image does not overlap with the approximated rectangle of the other vehicle.

The present configuration of the unit may enable the image not to interrupt visual recognition of the other vehicle by an occupant.

Other Embodiment

In the above example, the entire path is divided into a small number of segments to simplify the explanation. Each of the segments 1 to 7 may be divided into a large number of fine segments such as hundreds or thousands of segments, and a group of the fine segments may be incorporated into the corresponding one of the segments 1 to 7.

The created images are not limited to the above examples. The created images may have various shapes, colors, and movement other than the examples. The image may be modified in at least one of the shape, the size, the closeness, the color, and the scroll speed. The image may be modified in transparency similarly to modification in color.

The functions of the ECUs are one example. The two or more ECUs may be combined or the ECU may be separated into multiple devices.

The electric connections are example. Various configuration of connection and communication are arbitrarily employable. Devices and ECUs may be communicated via LAN and/or via an electric wire.

It should be appreciated that while the processes of the embodiments of the present disclosure have been described herein as including a specific sequence of steps, further alternative embodiments including various other sequences of these steps and/or additional steps not disclosed herein are intended to be within the steps of the present disclosure.

While the present disclosure has been described with reference to preferred embodiments thereof, it is to be understood that the disclosure is not limited to the preferred embodiments and constructions. The present disclosure is intended to cover various modification and equivalent arrangements. In addition, while the various combinations and configurations, which are preferred, other combinations and configurations, including more, less or only a single element, are also within the spirit and scope of the present disclosure.

What is claimed is:

1. An automated driving device for a vehicle, comprising:
   an automated driving unit configured to perform an automated driving by implementing a present operation and a subsequent operation, the subsequent operation being an operation to be implemented subsequently to the present operation, wherein the subsequent operation includes an acceleration quantity of an acceleration device of the vehicle;
   a determining unit configured to determine the present operation and the subsequent operation;
   an imaging unit configured to:
      create an image relevant to the subsequent operation according to information on the subsequent operation;
      create the image according to the acceleration quantity;
      create the image representing an arrow in response to the acceleration quantity greater than or equal to an acceleration threshold; and
      sharpen the arrow according to increase in the acceleration quantity; and
   a display unit configured to indicate the image relevant to the subsequent operation while the automated driving unit implements the present operation.

2. The automated driving device according to claim 1, wherein:
   the subsequent operation further includes a steering quantity of a steering device of the vehicle; and
   the imaging unit is configured to create the image according to the steering quantity.

3. The automated driving device according to claim 1, wherein the imaging unit is configured to create the image representing
   a rectangle in response to the acceleration quantity less than the acceleration threshold.

4. The automated driving device according to claim 1, wherein the imaging unit is configured to:
   increase a length of the image according to increase in the acceleration quantity; and
   decrease the length of the image according to decrease in the acceleration quantity.

5. The automated driving device according to claim 1, wherein:
   the image includes a plurality of image elements; and
   the imaging unit is configured to:
      decrease a space between the image elements according to increase in the acceleration quantity; and
      increase the space of between image elements according to decrease in the acceleration quantity.

6. The automated driving device according to claim 1, wherein the imaging unit is configured to:
   increase a scroll speed of the image according to increase in the acceleration quantity; and
   decrease the scroll speed of the image according to decrease in the acceleration quantity.

7. The automated driving device according to claim 2, wherein the imaging unit is configured to create the image curved at a curvature according to the steering quantity.

8. The automated driving device according to claim 1, wherein the display unit is at least one of:
   a head-up display device configured to project the image; and
   an indicator device located in an instrument cluster.

9. An automated driving device for a vehicle, comprising:
   an automated driving unit configured to implement an automated driving by implementing a first operation and a second operation in order, wherein the second operation includes an acceleration quantity of an acceleration device of the vehicle;
   a determining unit configured to determine a series of operations including the first operation and the second operation;
   an imaging unit configured to:
      create an image relevant to the second operation according to information on the second operation;
      create the image according to the acceleration quantity;

create the image representing an arrow in response to the acceleration quantity greater than or equal to an acceleration threshold; and sharpen the arrow according to increase in the acceleration quantity; and a display unit configured to indicate the image while the automated driving unit implements the first operation.

10. The automated driving device according to claim 9, further comprising:

a segmenting unit configured to divide a travelling path into a first segment and a second segment through which the vehicle is to travel in this order in the automated driving, and the display unit is configured to indicate the image relevant to the second operation, which is to be implemented in the second segment, while the automated driving unit implements the first operation in the first segment in the automated driving.

11. The automated driving device according to claim 9, further comprising:

a surrounding information acquisition unit configured to acquire surrounding information of the vehicle, wherein the determining unit is configured to correct the first operation and the second operation according to the surrounding information, and the imaging unit is configured to create the image according to information on the second operation as corrected.

12. An assisting device connected to an automated driving device, the automated driving device configured to implement a series of operations of a vehicle including a first operation and a second operation implemented in order, the assisting device comprising:

a communication unit configured to communicate with the automated driving device to retrieve information on the first operation and the second operation; and an imaging unit configured to:

create images representing the first operation and the second operation, respectively, according to the information;

create the images representing an arrow in response to an acceleration quantity greater than or equal to an acceleration threshold;

sharpen the arrow according to increase in the acceleration quantity; and cause a display device to indicate the image representing the second operation while the automated driving device implements the first operation.

* * * * *